March 24, 1953 — A. MARKS ET AL — 2,632,725

METHOD OF LAMINATING LENSES

Filed Aug. 6, 1943 — 2 SHEETS—SHEET 1

INVENTOR.
Alvin Marks
BY Mortimer Marks

Pineles & Greene
ATTORNEYS

Patented Mar. 24, 1953

2,632,725

UNITED STATES PATENT OFFICE 2,632,725

METHOD OF LAMINATING LENSES

Alvin Marks and Mortimer Marks,
New York, N. Y.

Application August 6, 1943, Serial No. 497,614

10 Claims. (Cl. 154—128)

Our invention relates to a novel lamination comprising a very thin optically isotropic plastic interlayer, and the method of making it, and more particularly our invention relates to a color filter comprising two glass plates with a clear or colored plastic interlayer, the interlayer being of unusual thinness and having certain unusual properties of adhesion and high optical perfection, the lamination being either flat or curved.

Clear or color filters have previously been made comprising external glass plates with an interlayer of clear or colored plastic therebetween. Such filters, however, are deficient in that the clear or colored plastic interlayer is of such thickness and composition that certain optical errors are encountered when light is transmitted therethrough.

Moreover in precision surfacing of thick laminations errors are introduced by the yielding of the plastic interlayer under the grinding and polishing pressure and its subsequent springing back non-uniformly to introduce errors of curvature.

Accordingly, it is the object of our invention to provide a novel method of forming a thin uniform layer of plastic.

It is a further object of our invention to provide a lamination having a plastic interlayer in which the plastic interlayer is of unusual thinness, so that optical errors may be minimized.

Another object of this invention is to provide a clear or colored glass lamination in which tempered glass is employed, thus providing a new and novel combination of unusual strength characteristics.

It is a further object of the present invention to provide a lamination comprising a plastic interlayer in which the plastic interlayer is firmly and permanently adhered to the glass.

It is a further object of our invention to join the surfaces of optical elements together using a colorless or colored adhesive in such a manner as to provide a strong optically isotropic and continuous joint.

It is a further object of the present invention to form a lamination having a layer containing a dyestuff, said dyestuff being unaffected by the laminating medium.

It is a further object of the present invention to provide a plastic interlayer where the plastic is so applied to the glass as to be in flat, even optical contact therewith.

Further objects of the present invention will be apparent from a consideration of the description thereof which here follows:

We accomplish these objects of our invention by applying to the glass a plastic solution containing a dyestuff having the desired spectral response, the plastic dyestuff solution being applied on to the glass plates in liquid or semi-liquid form, the glass plate being then rotated at relatively high speed so that the plastic solution is spread evenly and quickly over the surface of the glass plate whereupon a thin film rapidly dries to a flat uniform skin which is strongly adherent to the plate. In this process a slightly raised bead is formed about the periphery or outer edge of the coating.

Physical requirements for the production of a perfect coating are (1) a smooth and clean glass surface, preferably polished, which is either flat or curved (2) the edge of the plate should be beveled sufficiently to receive the peripheral bead which forms during the spinning and because of the bevel is disposed below the level of the surface being laminated (3) the lacquer should be carefully filtered to eliminate dirt particles and to provide a composition of uniform viscosity (4) the atmosphere surrounding the plate during the coating and drying operation must be clean and preferably of relative humidity not exceeding 50%, (5) the plastic solution should be substantially free from bubbles and is best applied by tilting the glass plate at an angle of approximately thirty degrees to the horizontal and flowing the plastic solution on from an edge toward the center.

In the case of larger diameter plates, and optionally in the case of smaller diameter plates, a protecting plate is superimposed over the glass plate being coated at a small distance thereabove, this second protecting glass plate having a protective function. During the coating operation plastic threads which may be formed from the excess lacquer thrown off during the rotation of the glass plate tend to swirl back upon and mar the perfection of uniform skin formation. This operation will be more particularly explained hereinafter. After the coating is formed on the glass plate and has been thoroughly dried, a similarly coated glass plate or an adhesive coated glass plate is joined thereto by means of a suitable laminating oil so that a lamination comprising an extremely thin interlayer is formed.

The films which comprise the plastic interlayer, because of the nature of their application, are extremely thin and as perfectly flat as the surface on which they are formed. The plastic layer on the support surfaces may be as thin as .0003 to .0015 inch.

Figure 1:
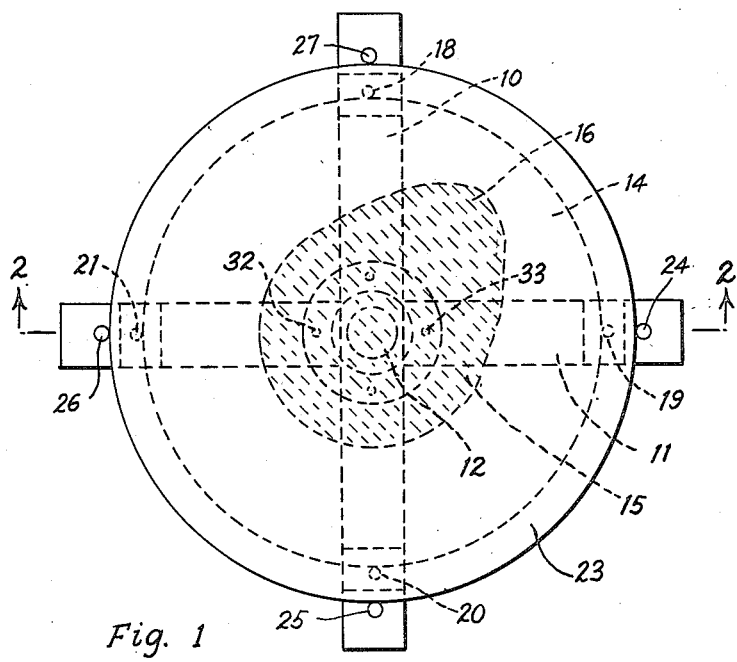
Figure 1 is a plan view of the spinner apparatus of our invention.
Figure 2:
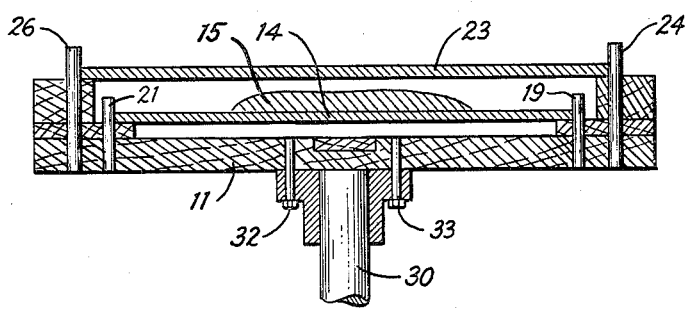
Figure 2 is a cross section taken along the line 2—2 of Figure 1.

Referring now more specifically to Figures 1 and 2, we show cross pieces 10 and 11 firmly centrally secured at 12. On a glass plate 14 is shown a gob of plastic 15 which is applied by pouring inwardly from a point 16 towards the center 12. The glass plate is supported within pins 18, 19, 20 and 21. A cover plate 23 supported within pins 24, 25, 26 and 27 overlies and extends slightly beyond the glass plate 14 and protects the plastic coating formed thereon from the threads of plastic that are thrown sidewardly during the spinning as will be explained in connection with Figure 3.

A spinning shaft 30 affixed to the cross piece 11 by bolts 32 and 33 and driven by some suitable source of power rotates the spinning table.

Figure 3:
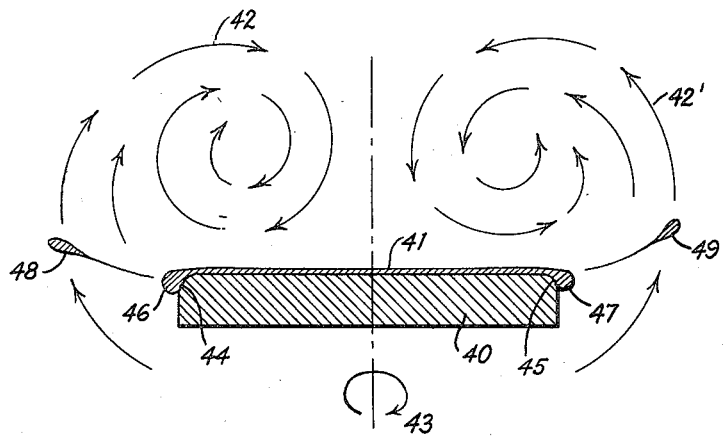
Figure 3 is a diagrammatic drawing showing the action of the plastic coating during the spinning and the turbulent air currents that are present.

In Figure 3, I diagrammatically show the action here involved and more particularly I show a glass plate 40 with a plastic coating 41 thereon. The glass plate 40 is being revolved about its axis in the direction shown by the arrow 43 so that the plastic 41 is distributed over the glass plate 40. The edges of the glass plate are beveled at 44 and 45 so that the peripheral beads of plastic 46 and 47, which are normally thicker than the centrally disposed plastic, sink below or to the level of the coating 41, the beads 46 and 47 being positioned in the bevels 44 and 45. In the course of the rapid rotation, the threads or droplets of plastic 48 and 49 are thrown off by the centrifugal force of spinning and these threads or gobs of plastic 48 and 49 are caught up in the turbulent air currents indicated at 42 and 42' which, it will be noted, would tend to bring the gobs of the plastic up and down over on to the plastic coating 41. This would impair the smoothness and uniformity of the plastic coating 41. This is prevented by means of the cover plate 23 shown in Figures 1 and 2.

Alternatively to intercepting the threads of plastic material by the protecting plate positioned slightly above the rotating support, we may employ (a) wires or other arms on the support, said wires extending outwardly or upwardly so as to intercept the plastic threads thrown off by the rotating plate by centrifugal force, said wire elements intercepting said plastic threads and preventing them from being thrown back on to the coating formed on the plate, or (b) we may position the support in a container and on the side of the container place vanes so directed that the turbulent air generated by the rotating support is directed downwardly so that the plastic threads thrown off by the rotating support are directed downwardly and the threads consequently are caused to adhere to the sides and bottom of said container.

By spinning this plate 40 about its axis rapidly a gob of liquid or semi-liquid plastic which has been applied on to the glass plate is rapidly caused to spread over and flow into the form of a uniform thin plastic coating on the glass plate. The plastic during the spinning forms a dry upper skin and the liquid plastic is caused to flow centrifugally under that skin. When it reaches the edge, the excess is discharged sidewardly as indicated by the drops 48 and 49. The plastic rapidly dries to form a very flat thin uniform plastic coating and when the edge bevels 44 and 45 are provided the slightly thickened edge bead 46 which forms is compensated for and a flat over all coating is obtained.

Assuming a constant viscosity of the plastic solution, the greater the speed, the thinner the coating obtained. At constant speed, the lower the viscosity, the thinner the film obtained.

The plate is then heated, preferably using infra red heating lamps and a current of clean dry air to drive off the solvent.

The distance between the lower glass plate and the upper protecting glass plate may range anywhere from about $\frac{1}{32}$ of an inch to ½ of an inch, or even greater spacing may be employed, larger distances being usable with larger diameter surfaces being coated.

After the glass plate 40 is so positioned with the plastic solution 41 applied thereto and the glass plate 23 placed thereover, it is rotated at a speed varying between 300 and 3,000 revolutions per minute, depending upon the thickness of the coating required.

Figure 4:
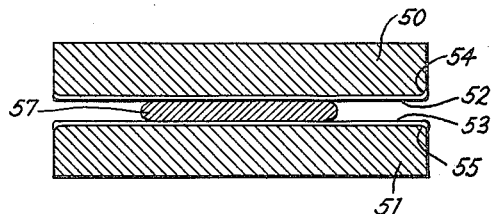
Figure 4 is a diagrammatic view showing a lamination of our invention.

In Figure 4 I show the lamination of glass plates 50 and 51 which have coatings 52 and 53 formed thereon by the process shown in Figures 1 to 3.

The edges of the glass plates are beveled at 54 and 55 to compensate for the thickened peripheral plastic bead so as to form a substantially flat coating.

A suitable laminating oil 57 which, for example, may comprise blown castor oil or dioctyl phthalate is used to effect the lamination of the plastic coatings 52 and 53. The plastic coating 52 is a clear plastic coating and plastic coating 53 contains a dyestuff which gives the lamination the desired color response. The nature of these coatings is more particularly described in the examples which follow.

The plasticizer 57 is slowly absorbed by the clear plastic coating 52, but the plasticizer or laminating oil is such that it has no dissolving action on either the plastic coating 53 or the dyestuff contained therein.

Figure 5:
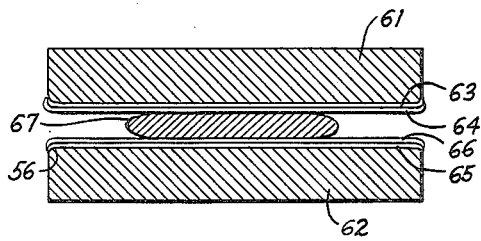
Figure 5 is a modified lamination of our invention.

In Figure 5 we show a glass plate 61 and 62 with a coating containing a dyestuff 63 disposed on the glass plate 61 and a clear transparent plastic coating 64 disposed over the coating 63. These coatings may be applied successively accordingly to the method described above in connection with Figures 1 to 3.

Similarly on the glass plate 61 is a plastic coating 65 containing a dyestuff and a second plastic coating 66 disposed over said colored coating 65. A laminating oil 67 which may comprise oxidized castor oil or a plasticizer such as dioctyl phthalate is used to effect the lamination of these two coated plates 61 and 62. The laminating medium 67 softens and is slowly absorbed by the clear plastic coatings 64 and 66 but the plastic coatings 63 and 65 are such that they are neither soluble nor substantially affected by the laminating medium 67. The solvents used for the plastic coatings 64 and 66 are selected so that the colored plastic coatings 63 and 65 are insoluble therein so that the coatings 63 and 65 are unaffected by the liquid plastic solutions which form the coatings 64 and 66.

A typical example of the plastic solution which I may apply to the glass plate 51 to form the coating 53 is the following:

A

Polyvinyl formal, 90 parts by weight
Polyvinyl acetal, 10 parts by weight
Sudan Red (commercial name for red dyestuff), sufficient for the intensity of color desired.

The solution of polyvinyl formal and polyvinyl acetal in the proportions shown is then dissolved in trichlor ethane to form a 5–20% solution thereof in that solvent, with the preferred range running from about 10–15%.

The second glass plate 50 may be coated with a 10–21% solution of ethyl methacrylate and/or methyl methacrylate or other suitable adhesive material dissolved in a solvent which may for example comprise 75% of ethylene dichloride and 25% of xylol. The ethyl and methyl methacrylate may be used in equal parts but the proportions may be varied, or other plastics belonging to the methacrylate group may be employed.

High boiling solvents such as trichlorethane and xylol are preferred to prevent "blushing" of the coatings due to atmospheric condensation thereon; which would be caused by the rapid lowering of surface temperature if low boiling, more rapidly evaporating solvents were employed.

The first plate 51 containing the flat uniform dry coating 53 of the polyvinyl acetal and polyvinyl formal as set out in Example A above is then laminated to the second plate 50 having a coating 52 of ethyl and methyl methacrylate which has been suitably dried and solidified on the second glass plate, the lamination being effected by flowing over one or both of the plastic coatings a plasticizer such as dioctyl phthalate 57 and eliminating the excess by compressing 50 and 51 together. The plasticizer 57 only very slightly softens the polyvinyl compound plastic coating and is eventually substantially fully absorbed by the methacrylate plastic coating. To accomplish this result, the two plates 50 and 51 and the plastic coatings 52 and 53 are faced to each other with the dioctyl phthalate 57 therebetween and then subjected to a relatively low pressure, such as, for example, from one-half to ten lbs. per square inch, the excess dioctyl phthalate being squeezed out by the pressure; and then by heating for three hours at 55–65° C., an adhesion of the composite is effected.

Lamination by stacking may be employed with flat or curved lenses coated according to the techniques herein described or by other methods of producing surface coatings.

A laminating jig is prepared by fastening three or more vertical rods to a base. The glass plates are dropped between the rods and stacked above each other thereby. The coated surfaces have suitable plasticizer applied thereto as by flowing the plasticizer onto a tilted coated plate from the edge to avoid excessive bubble formation. The coated surfaces facing each other with the plasticizer inbetween are placed in the jig as described and a weight or other compressive means applied. For example as many as 50 sets or more of plates may be stacked in this manner and simultaneously laminated. The plasticizer should be of sufficiently high viscosity to flow slowly out from the edge when the pressure is applied thus insuring complete bubble elimination. If the viscosity of the plasticizer is too low, flow occurs before the stacking is complete, thus causing possible non-contacting areas or bubbles.

As further examples of plastic coatings that may be used on the glass plates 61 and 62 we give the following:

B

| | Percent |
|---|---|
| Polystyrene resin | 75 |
| Cumarone indene | 25 |

Optional: To improve adhesion—15% of plasticizer may be added. Plasticizers such as dibutyl phthalate, aroclor liquid or others may be employed.

The polystyrene resin and the cumarone indene are dissolved in xylol to make a 10–20% solution and suitable red dye such as Sudan Corinth B is thoroughly mixed therewith in proportions suitable for the required color density. The solution is carefully filtered.

Solution B is then coated onto a glass plate by the spin techniques herein described.

C

Polyvinyl butyral sufficient to form a 5% solution in normal propanol is coated over the coating B using the spin technique.

In this example the glass cover plate may be similarly coated with 10% solution of polyvinyl butyral. To effect the adhesion between the polyvinyl butyral coatings, they are first thoroughly dried under a heat lamp and then blown castor oil is applied thereto as a plasticizer. Under relatively low pressure, as for example 10 lbs. per square inch, and a temperature of 55–65° C., the two coated plates are pressed together and form a very adherent lamination.

The method of lamination by which a plasticizer is introduced between the two coated plates having extremely flat uniform coatings and then squeezed out avoids the inclusion of air bubbles in the lamination since the bubbles readily flow out with the excess plasticizer which is eliminated from the edges under pressure.

We have discovered certain broad principles regarding the nature of the coatings and dyestuffs which may be employed to carry out this invention, as follows:

1. The plastic coatings should comprise materials which have excellent adhesion to glass such as the polyvinyl formal, acetal and butyral types, or the methacrylate type resin such as methyl, ethyl, etc. or other resins having similar adhesive properties;

2. Dyestuffs employed should be highly soluble in the solvents employed in preparing the plastic solutions, and highly compatible with the plastic solid when the solvent is evaporated;

3. The plasticizer should have but slight softening action and no substantial dissolving action, on either the plastic solid or the dyestuff employed in the colored coating. For example the dioctyl phthalate or blown castor oil has very slight dissolving action on the plastics suggested here for the colored coatings such as Formulas A and B herewith, or on the Sudan dyestuffs (organic cyclic compounds containing nitrogen chromophores) which dissolve in cyclic or chlorinated type solvents. In this manner we prevent the coloring matter from flowing within the lamination, which would detract from the uniform distribution produced in the coating operation;

The plastic coating on the other glass plate is of such nature that it is softened by the laminating oil only when subjected to heat. Accordingly, when the laminating oil is applied to one or the other of the plastic coated surfaces and the surfaces are pressed together, the pressure applied is sufficient to drive out all but a very thin layer of the plasticizer which lies between the two plastic coatings. After this excess laminating oil is driven out the lamination is subjected to heat and this heat effects the penetration of the laminating oil into the plastic coating that contains no dyestuff whereby the adhesion between the plastic coatings is effected. Even in the presence of heat, the laminating oil has little or no effect on the plastic coating containing the dyestuff or on the dyestuff.

4. The plasticizer should be slowly but completely absorbed in the clear adhesive coating or coatings. This must occur slowly to allow sufficient time to permit the multiple stacking and application of pressure to allow the excess plasticizer to flow out thus eliminating the bubbles and leaving only an extremely thin layer of plasticizer to be absorbed in time and on application of heat.

A plasticizer which is absorbed too rapidly would produce too loose a lamination since too much plasticizer would be absorbed into the adhesive coatings before the excess plasticizer could be squeezed out.

The thinness of the plastic coatings and the interlayer thus formed is such that the usual optical errors encountered in laminations in which the plastic interlayer is present are substantially avoided.

We have found that small laminations, as for example lenses, filters and the like can best be made by forming a coating on a large plate as explained herein and then cutting that large plate unit into a plurality of small units. A product having a plastic film of more uniform thickness is obtained. In order to follow this process it is necessary that the lacquer have good adhesion to the glass and also be sufficiently low in tensile strength so that it can be satisfactorily separated into small units. For this purpose we use a polystyrene cumarone resin with 10% of dibutyl phthalate. The resin combination is illustrated in Example B hereinabove.

Not only is a superior and more effective small unit made by this process of forming a large plate unit and cutting it up, but the manufacturing process is considerably economized both in time and labor.

The process of the present invention is useful also in the lamination of achromatic lenses where curved surfaces are to be laminated together.

In addition to providing a colored filter lamination, it is within the scope of our invention to form a colorless lamination by the method and combinations set forth. We may particularly form a lamination having an extremely thin plastic interlayer as set forth hereinabove. To form this colorless lamination we may, for example, coat the surfaces of both glass plates or other elements with methyl methacrylate or with polyvinyl butyral coatings. The same procedure of applying these coatings on to the glass plates and rapidly spinning the glass plates to form a thin adherent coating thereon followed by applying the laminating oil to the coating or coatings and squeezing out the excess of that oil may be employed to form the colorless lamination with the thin plastic interlayer.

In addition to forming laminations by the method set forth herein, we may also form films or sheets of plastic material by forming suitable plastic solutions, applying such solutions to a support, rotating the support so as to evenly distribute the solution over a relatively large area in the form of uniform coating, drying the coating by removing the solvent from the solution by the rapid rotation of the support and/or by additional heating and finally stripping the film sheeting or coating thus formed from the support.

More specifically, we may form a solution of polyvinyl acetal or butyral dissolved in a suitable solvent, such as normal propyl alcohol, or ethyl or methyl methacrylate or copolymers thereof dissolved in a suitable solvent, such as 75% ethylene dichloride-25% xylol, and apply such plastic solution to a flat support mounted so as to rotate about its vertical axis, the plastic being applied to the support which may comprise a glass table by first tilting that table off the horizontal so that this plastic solution can be applied to said tilted support to avoid the formation of bubbles thereon, and then rotating the support at a speed of from 300 to 3,000 R. P. M. to distribute the plastic solution over the support to rapidly dry the same to a thin substantially uniform film. If the nature of the plastic is such that it inherently adheres to the supporting table such as the glass plate, it is necessary to pretreat the glass plate with a lubrication coating such as zinc stearate, to enable the easy separation or stripping of the dried film therefrom. However, in the case of many of the plastic solutions, they may, when dried to form a film on the glass support, be readily stripped therefrom, particularly if little or no plasticizer is present in the plastic film formed.

In lieu of ordinary glass, we may use tempered glass by means of which we can obtain exceptionally strong laminations capable of withstanding extreme conditions of pressure and impact. Prior attempts to produce solid glass colored filters of tempered glass were unsuccessful because of non-uniform color changes induced in the filter glass by the heating and cooling procedures employed in the tempering. According to the present invention we indicate the usage of a clear or colorless tempered glass and a colored plastic interlayer by means of which the desired color response is obtained.

We may form a polarizer by depositing by means of the spin technique described hereinabove a multiplicity of extremely thin plastic layers one upon the other. For example, we may spin cast approximately 20–30 layers of polyvinyl butyral (Formula C) with alternate layers of polystyrene and coumarone indene resin (Formula B) therebetween.

The principle employed herein is the formation of successive thin plastic layers having widely different indices of refraction, a new layer being formed upon each preceding layer; the solvent, employed in the new layer being formed, having no dissolving action on the plastic comprising the preceding supporting layer.

In other words the solvent for the polyvinyl butyral is not a solvent for the polystyrene-coumarone indene layer on which the polyvinyl butyral layer is cast.

By this method we may form a large number of alternate layers of substances having abruptly different indexes of refraction, the polyvinyl butyral having an index of refraction of 1.48 and polystyrene having an index of refraction of 1.60. The thickness of the layers may vary from between .0003 to .0015. Each layer is dried before the next succeeding layer is applied thereto.

The polarizer thus formed, although it comprises the proper number of layers has a desirable complete thinness, possible because of the spin technique method of forming the thin layers.

The spin technique described herein may be employed to coat plastic sheets and films of any size and shape. Thin coatings of similar or dissimilar plastic materials may be applied thereto in the form of thin uniform coatings. Clear films may be coated with colored plastic solution to form colored coatings thereon.

Various modifications of our invention will suggest themselves to those skilled in the art. We accordingly desire that in construing the breadth of the appended claims that they shall not be limited to the specific details shown and described in connection with the above specification.

We claim:

1. A method of forming an optically isotropic lamination the steps comprising applying a liquid plastic solution to the surface of an optical element, rotating the optical element about an axis substantially perpendicular to said surface until the plastic solution is spread uniformly over the support in a very thin layer and is dried thereon to form a solid coating, applying a plasticizer which only slightly softens the plastic coating to the coated element and laminating it to a second optical element under low temperature and pressure.

2. A method of forming an optically isotropic lamination the steps comprising applying a liquid plastic solution to the surface of an optical element, rotating the optical element about an axis substantially perpendicular to said surface until the plastic solution is spread uniformly over the support in a very thin layer and is dried thereon to form a solid coating, applying a plasticizer which only slightly softens the plastic coating to the coated element and laminating it to a similarly coated optical element.

3. A method of forming an optically isotropic lamination the steps comprising applying a liquid plastic solution to the surface of an optical element, rotating the optical element about an axis substantially perpendicular to said surface until the plastic solution is spread uniformly over the support in a very thin layer and is dried thereon to form a solid coating, applying a plasticizer which only slightly softens the plastic coating to the coated element and pressing it against a similarly coated optical element under a pressure of ½ to 10 lbs. per square inch and at a temperature of 55-65° C.

4. A method of forming an optically isotropic lamination the steps comprising applying a polyvinyl acetal solution to the surface of an optical element, rotating the optical element about an axis substantially perpendicular to said surface until the plastic solution is spread uniformly over the support in a very thin layer and is dried thereon to form a solid coating, applying a castor oil plasticizer which only slightly softens the plastic coating to the coated element and laminating it to a second optical element under low temperature and pressure.

5. A method of forming an optically isotropic lamination the steps comprising applying a polyvinyl acetal solution to the surface of an optical element, rotating the optical element about an axis substantially perpendicular to said surface until the plastic solution is spread uniformly over the support in a very thin layer and is dried thereon to form a solid coating, applying blown castor oil which only slightly softens the plastic coating to the coated element and pressing it against a similarly coated optical element under a pressure of ½ to 10 lbs. per square inch and at a temperature of 55-65° C.

6. A method of forming an optically isotropic lamination the steps comprising applying a liquid plastic solution to the surface of a transparent optical element which has a beveled edge rotating the optical element about an axis substantially perpendicular to said surface until the plastic solution is spread uniformly over the support in a very thin layer and is dried thereon to form a solid coating, applying a plasticizer which only slightly softens the plastic coating to the coated element and laminating it to a second optical element.

7. A method of forming an optically isotropic lamination the steps comprising applying a colored liquid plastic solution to the surface of an optical element rotating the optical element about an axis substantially perpendicular to said surface until the plastic solution is spread uniformly over the support in a very thin layer and is dried thereon to form a solid coating, applying a transparent coating to the colored coating and spreading and drying it in the same way, applying a plasticizer which only slightly softens the plastic coating to the coated element and laminating it to a second optical element.

8. A method of forming an optically isotropic lamination the steps comprising applying an acrylic resin solution to the surface of an optical element, rotating the optical element about an axis substantially perpendicular to said surface until the plastic solution is spread uniformly over the support in a very thin layer and is dried thereon to form a solid coating, applying dioctyl phthalate which only slightly softens the plastic coating to the coated element and laminating it to a second optical element under low temperature and pressure.

9. A method of forming an optically isotropic lamination the steps comprising applying an acrylic resin solution to the surface of an optical element, rotating the optical element about an axis substantially perpendicular to said surface until the plastic solution is spread uniformly over the support in a very thin layer and is dried thereon to form a solid coating, applying dioctyl phthalate which only slightly softens the plastic coating to the coated element and pressing it against a similarly coated optical element under a pressure of ½ to 10 lbs. per square inch and at a temperature of 55-65° C.

10. A method of forming an optically isotropic colored lamination, the steps comprising applying a liquid plastic solution containing a dyestuff to the surface of an optical element, rotating the optical element about an axis substantially perpendicular to said surface until the plastic solution is spread uniformly over the support in a very thin layer and is dried thereon to form a solid coating, applying a plasticizer which only slightly softens the plastic coating to the coated element and laminating it to a second optical element under low temperature and pressure.

ALVIN MARKS.
MORTIMER MARKS.

(References on following page)

REFERENCES CITED

The following references are of record in the file of this patent:

UNITED STATES PATENTS

| Number | Name | Date |
|---|---|---|
| 1,411,177 | Mitchell | Mar. 28, 1922 |
| 1,530,185 | Lorenz | Mar. 17, 1925 |
| 1,530,614 | Pleister | Mar. 24, 1925 |
| 1,578,952 | Campbell | Mar. 30, 1926 |
| 1,592,608 | Lorenz | July 13, 1926 |
| 1,842,640 | Zimmerli | Jan. 26, 1932 |
| 1,980,970 | Monro | Nov. 13, 1934 |
| 2,007,645 | Geisel | July 9, 1935 |
| 2,027,435 | Kallander | Jan. 14, 1936 |
| 2,092,789 | Tillyer | Sept. 14, 1937 |
| 2,119,702 | Carroll | June 7, 1938 |
| 2,122,178 | Land | June 28, 1938 |
| 2,139,369 | Kyrides | Dec. 6, 1938 |
| 2,149,732 | Groff | Mar. 7, 1939 |
| 2,184,672 | Jackman | Dec. 26, 1939 |
| 2,218,165 | Gaebel | Oct. 15, 1940 |
| 2,252,898 | Pollack | Aug. 19, 1941 |
| 2,319,051 | Fordyce et al. | May 11, 1943 |
| 2,335,371 | Willis | Nov. 30, 1943 |

FOREIGN PATENTS

| Number | Country | Date |
|---|---|---|
| 9332/32 | Australia | Sept. 25, 1933 |
| 464,576 | Great Britain | Apr. 20, 1937 |